(12) United States Patent
Dartigues et al.

(10) Patent No.: US 6,366,929 B1
(45) Date of Patent: Apr. 2, 2002

(54) SERVICE CONTROL AND MANAGEMENT SYSTEM

(75) Inventors: Guy Dartigues, Montreal (CA); Claude Ferraris, Aix en Provence; Guy Guistini, La Ciotat, both of (FR)

(73) Assignee: Gemplus

( * ) Notice: Subject to any disclaimer, the term of this patent is extended or adjusted under 35 U.S.C. 154(b) by 0 days.

(21) Appl. No.: 09/230,640

(22) PCT Filed: Jul. 17, 1997

(86) PCT No.: PCT/FR97/01337

§ 371 Date: Jun. 7, 1999

§ 102(e) Date: Jun. 7, 1999

(87) PCT Pub. No.: WO98/03940

PCT Pub. Date: Jan. 29, 1998

(Under 37 CFR 1.47)

(30) Foreign Application Priority Data

Jul. 24, 1996 (FR) .............................. 96 09274

(51) Int. Cl.⁷ .......................... G06F 12/00; G06F 17/60; G06F 17/00; G06K 5/00
(52) U.S. Cl. ..................... 707/200; 707/10; 707/104.1; 709/223; 705/32; 705/41; 235/382; 235/375
(58) Field of Search ............................. 705/41, 10, 17, 705/26, 32; 706/23; 235/382, 375, 380; 364/406; 707/200, 10, 103, 104.1; 709/223

(56) References Cited

U.S. PATENT DOCUMENTS

| | | | | |
|---|---|---|---|---|
| 4,628,193 A | * | 12/1986 | Blum | 235/375 |
| 5,068,787 A | * | 11/1991 | Pipella et al. | 364/406 |
| 5,459,305 A | * | 10/1995 | Eriksson | 235/382 |
| 5,566,327 A | * | 10/1996 | Sehr | 707/200 |
| 5,649,118 A | * | 7/1997 | Carlisle et al. | 705/10 |
| 6,038,551 A | * | 3/2000 | Barlow et al. | 705/41 |
| 6,131,090 A | * | 10/2000 | Basso, Jr. et al. | 706/23 |
| 6,145,739 A | * | 11/2000 | Bertina et al. | 235/380 |

FOREIGN PATENT DOCUMENTS

| | | | |
|---|---|---|---|
| CH | 673164 | 2/1990 | |
| EP | 621565 | 10/1994 | |
| FR | 2683930 | * 5/1993 | ........... G06F/15/46 |
| FR | 2689275 | 10/1993 | |
| FR | 2693816 | 1/1994 | |
| WO | 9306568 | 4/1993 | |
| WO | 9621203 | 7/1996 | |

OTHER PUBLICATIONS

Martin et al., Process For Recording the Time Spent by Prople on Operations, May 21, 1993, Translated French Patent No. 2,683,930, pp. 1–8.*

* cited by examiner

Primary Examiner—Frantz Coby
(74) Attorney, Agent, or Firm—Roland Plottel

(57) ABSTRACT

A service control and management systems, and more specifically a system to manage hourly working services, that has service beneficiaries' and/or service providers' smart cards, smart card readers at service sites, and a central server capable of communicating with the readers. In the system each reader has means for initializing a service time count after initialization of the transaction until a service ending time. Also, there are means for recording, periodically on a non-volatile memory, information relating to the performance of the services, and means for transmitting the information from the reader to the central server.

12 Claims, 9 Drawing Sheets

| BENEFICIARY'S CARD IDENTIFIER | |
|---|---|
| | |
| BENEFICIARY'S IDENTIFIER | |
| BENEFICIARY'S IDENTIFIER | |
| SURNAME | |
| FIRST NAME | |
| DATE OF BIRTH | |
| SEX | |
| | |
| READER'S PARAMETERS | |
| IDENTIFIER OF LESSOR 1 | |
| TYPE OF SERVICE 1 | |
| HOURS ALLOCATED FOR SERVICE 1 | |
| | |
| | |
| TYPE OF SERVICE n | |
| HOURS ALLOCATED FOR SERVICE n | |
| IDENTIFIER OF LESSOR 2 | |
| TYPE OF SERVICE 1 | |
| HOURS ALLOCATED FOR SERVICE 1 | |
| | |
| | |
| TYPE OF SERVICE n | |
| HOURS ALLOCATED FOR SERVICE n | |
| | |
| | |
| IDENTIFIER OF LESSOR k | |
| TYPE OF SERVICE 1 | |
| HOURS ALLOCATED FOR SERVICE k | |
| | |
| TYPE OF SERVICE n | |
| HOURS ALLOCATED FOR SERVICE n | |
| | |
| TELEPHONE NUMBER OF MAIN SERVER | |
| TELEPHONE NUMBER OF SECONDARY SERVER | |
| TIME/DAY FOR CALLING THE SERVER | |

STRUCTURE OF THE BENEFICIARY'S CARD MEMORY

*FIG. 2A*

| PROVIDER'S CARD IDENTIFIER | |
| --- | --- |
| | |
| PROVIDER'S IDENTIFIER | |
| PROVIDER'S IDENTIFIER | |
| SURNAME | |
| FIRST NAME | |
| DATE OF BIRTH | |
| SEX | |
| SERVICE SUPERVISOR 1 | |
| SERVICE AUTHORIZED 1 | |
| SERVICE AUTHORIZED 2 | |
| ... | |
| SERVICE AUTHORIZED n | |
| SERVICE SUPERVISOR 2 | |
| SERVICE AUTHORIZED 1 | |
| SERVICE AUTHORIZED 2 | |
| ... | |
| SERVICE AUTHORIZED n | |
| ... | |
| SERVICE SUPERVISED n | |
| SERVICE AUTHORIZED 1 | |
| SERVICE AUTHORIZED 2 | |
| ... | |
| SERVICE AUTHORIZED n | |
| | |
| TRANSACTION ZONE | |
| TRANSACTION 1 | INFORMATION ON TRANSACTION 1(*) |
| TRANSACTION 2 | INFORMATION ON TRANSACTION 2 |
| TRANSACTION 3 | INFORMATION ON TRANSACTION 3 |
| TRANSACTION 4 | INFORMATION ON TRANSACTION 4 |
| ... | ... |
| TRANSACTION n | INFORMATION ON TRANSACTION n |
| | |

*FIG. 2B*

SERVICE CONTROL AND MANAGEMENT SYSTEM

The invention relates to the systems for controlling and managing the services offered by service providers to users.

The invention consists of a service control and management system coping in particular with the complexity of the situations existing in the field of home-services financed by social entities which can be numerous and of different natures (County or Federal Councils, Health Department, state-owned insurance companies, pension funds, independent funds, communities, etc.).

This sector encompasses numerous entities which may be of associative character, offering simultaneously to the sponsors or lessors and to the beneficiaries to organise the said on-site service while providing the said assistance personnel and while taking care of most administrative procedures. These entities may be working on behalf of several lessors linked with the Social Department, but they may also be paid by an individual.

This case is considered as a 'multi-lessor and multi-provider' scheme.

The system according to the invention has been designed in order to take into account this multi-lessor and multi-provider aspect.

The invention therefore provides a global information management system. The system is capable of processing simultaneously the pieces of information necessary to several lessors and to several providers each involving several providers. It guarantees the confidentiality or the said information while addressing to each actor exclusively the data relating to the said actor in order to ensure the control and the management of his/her file.

The system also enables to process the case when a provider (individual) working at a beneficiary's premises is in fact providing a service considered as a State benefit (for instance a home help), then is working later in the day under another regime, this time sponsored by another lessor than the former (for instance a life auxiliary).

The system suggested enables to take into account the cases when a lessor mandates several service providing entities, the case when a service providing entity is mandated by several social lessors, the case when a (social) worker working under the responsibility of a service providing entity provides services of different natures, the cases when a beneficiary is allocated services of different natures.

According to an object of the invention, the system can suit any type of services provided on the site, subject to retribution for the service provider, or involving a check for the actual presence of a person by a supervising organisation.

The home services may be provided by a company, an association, a public or private entity, an individual, etc.

This service may take on different forms: home help, extra teaching, repairs, attendance, etc.

It may also be a service performed on a site which is not a person's home but geographically different from the original home of the service provider (temporary work, maintenance, upkeep, warden, etc.).

The control system according to the invention adopts a neutral attitude as regards the nature of the service, the personnel entrusted with its performance, the entities affected by the said service, whether they are public or private-owned.

The system according to the invention is an on-site service management system which makes the administrative and control procedures easier. Its aim is to meet the concerns of the various parties involved in these on-site tasks:

the service sponsor, also called lessor, who wishes to check the sums allocated to the service for efficient usage, the service provider who wishes to optimise the management of the personnel involved, the beneficiary from the services who wishes an additional assistance in his/her administrative steps.

FIG. 1 represents the global scheme of the control system according to the invention, in which are represented schematically the different providers or entities involved in performing or processing a service, as well as the links among them.

One or several service lessors (B1, B2, . . . , Bn), possibly connected by a network, form a central structure. This central structure accommodates one or several servers, which run a software package implementing the control and management system according to the invention.

A number of service providing entities (P1, P2, . . . , Pm) are connected to one or several lessors (B1, B2, . . . , Bn) via telephone lines, the server and the network. A set of providers (I1, I2, . . . , Ik) is available to perform services for a number of beneficiaries (b1, b2, . . . , bl) to whom the respective lessors allocate rights to services. Smart card readers L are assigned to the providers (such as providers I1 and I2 for instance) or to the beneficiaries (such as the beneficiary b3). The providers' or the beneficiaries' readers can be connected by a modem (not represented) and by a telephone line to the service providers and/or to the network of the respective lessors or directly to the lessors, failing any lessors' network.

The object of the invention is more specifically a control and management system comprising service beneficiaries' and/or service providers' smart cards, smart card readers fitted on the service sites while the said services are provided, a central server liable of communicating with the readers, whereas each reader comprises means for initialising a service transaction when inserting a beneficiary's and/or provider's card, means for initialising a service time count after initialisation of the said transaction and until a service ending time, means for recording, periodically on a non-volatile memory, pieces of information relating to the performance of the said services, and means for transmitting the said pieces of information from the reader to the central server.

The pieces of information relating to the performance of a service comprise data identifying and indicating the nature of the service.

The identification data contains:

an identifier of at least one service provider, an identifier of a beneficiary of the said service, an identifier of at least one lessor sponsoring the service, and the data indicating the nature the service contains the date and the time, the service duration, a piece of information significant of the nature of the task corresponding to the service.

The readers are fixed (installed on the service premises) or portable.

The invention will be described more accurately in the case of an organisation whose work is carried out by service providers for beneficiaries, at the beneficiaries' private homes, and in order to illustrate the said invention correctly, we shall examine the concrete case of a system used for controlling and managing home help work for elderly people.

One of the difficulties encountered in the management of this type of work is the necessity to have several organisation levels with different roles and which must collect the pieces of information matching their levels, while exercising their control; but without interfering with too complex an administration, thereby disturbing the daily operation of the organisation.

Thus, in the case of home help for elderly people, the different parties involved are the beneficiaries, the providers, the entities (associations for instance), supervising the said providers and paying the former, and finally public or private entities that distribute subsidies for this type of work and/or that are entrusted with making sure that the work carried out is paid in compliance with legal terms.

Other characteristics and advantages of the invention will appear when reading the detailed following description, with reference to the appended drawings on which:

FIG. 2A represents the information contained in the non-volatile memory of the beneficiary's card;

FIG. 2B represents the information on the provider's card;

Figure 1:
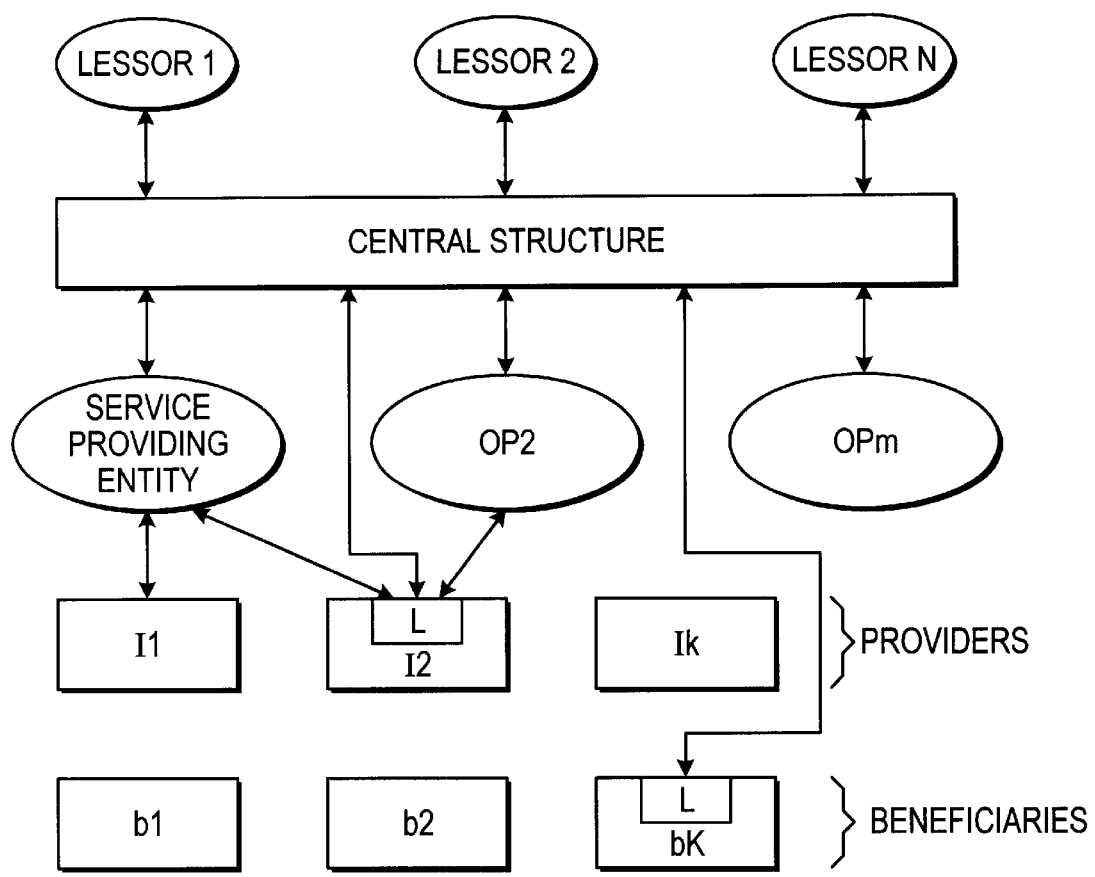
FIG. 1 represents the diagram of a global system according to the invention.

In order to ensure the management and control of the on-site services, the system takes into account all the necessary pieces of information.

To this end, each beneficiary and each member of the working staff has his/her own smart card and/or reader, containing qualified information and identifiers.

Each service site comprises a smart card reader which can be either fixed or portable. It is precisely this reader which enables processing the transaction. Once the transaction(s) has(have) been performed, it is the reader that will transmit the pieces of information to a server.

The said server proceeds to the necessary sorting and addresses these pieces of information to each one of the different actors in relation to their needs and levels of responsibility.

According to the case, the server can be either accommodated by a lessor or belong to a structure, independent from the lessors and vouching for the information processing on behalf of several lessors. For simplification purposes of our presentation, "central structure" will refer to a service lessor or several lessors connected within a network and accommodating a server performing the information processing according to the invention.

The main pieces of information transmitted from the reader to the server should enable to control the actual usage of the funds allocated to the said services and to ensure that the service providing entity is paid.

At its level, the service providing entity may recover useful information, either directly by interrogating the server or by interrogating the lessor(s), but also by reading the transactions contained in the cards of the staff having performed the service (i.e. the providers). These pieces of information are used essentially to pay the staff and to send an appropriate invoice to the lessors. At the level of the service providing entity, the information contained on the card and that traced back by the reader can be matched.

In the same way, the lessor may, before paying the mandated provider, check the number of hours invoiced against the information sent by the reader, then processed by the server.

The server also fulfils other functions:

It enables transmitting directly and automatically the details of a new beneficiary, "recruited" by a lessor as well as the rights to any services related to the said beneficiary, to the service providing entity that will handle his/her file.

In the sane-way, when a new person is recruited by a service providing entity, the details of this person can be transmitted to the lessor via the server.

The system provided also takes into account the electric customisation of the cards, either by a service performed externally or by customisation sets which can be installed at the lessors' premises, the service providers' premises or via a structure independent of the information management structure.

The system according to the invention provides various usage schemes of the cards and readers. Indeed, the system according to the invention can take oh different forms, notably:

1)—a fixed on-site reader, a card for each beneficiary, a card for each provider;

2)—a fixed on-site reader, customised with the beneficiary's details, a card for the provider;

3)—a portable reader carried by the provider, a card for the beneficiary, a card for the provider;

4)—a portable reader carried by the provider, a card for the beneficiary.

In all cases, the reader ensures the transmission of information to the processing centre. It may contain elements identifying either the beneficiary or the provider or both, according to the scheme adopted.

We shall now expose the details of the invention with reference to a peculiar embodiment corresponding to the usage scheme 1) introduced above. We can refer to FIG. 3 for assistance.

The beneficiaries of the said services can be for instance elderly people requiring a home help.

The service providers as individual providers may work part-time at the beneficiaries' homes.

It is advisable that the beneficiaries do not pay the providers directly and therefore the service providing entity, a service company or association, regroups the said providers, manages the distribution of their work and takes care of the payments.

The more global central structure, for instance a public entity, controls these home-provided service activities, for example because it allocates an assistance to the beneficiaries and wishes this assistance to be made in the form of subsidised services or still because the legality of the work performed must be controlled or for other reasons as well.

The public entity acts as a service lessor and allocates various numbers of hours to the beneficiaries; it wishes to keep track of the number of hours worked, to know who did what, who benefited from the said work, for what quantity each time and it wishes to check that the subsidies paid to the service providing entities have been faithfully applied.

As explained, the application then consists of several structure levels and the aim is, in spite of the complexity of the organisation, that home-provided work remains possible, without any impediment and even it should be made easier, without leading to any frauds or dishonest acts committed by the beneficiaries, the providers or the service providing entities.

According to the particular embodiment of the invention, a control and management system is provided, consisting of the following:

- a first set of smart cards, called "beneficiary's cards", containing in a non-volatile memory, at least one beneficiary identification and a time credit allocated,
- a second set of smart cards, called "provider's cards", containing in a non-volatile memory a provider identification and a transaction zone,
- smart card readers installed on the service sites,
- a central server capable of communicating with the readers,
- whereas each reader comprises means for initialising a service transaction when inserting an authorised beneficiary card in the said reader, means to initialise a service time counter from the moment when a provider card is inserted in the reader after initialisation of the transaction down to the end of the said service, means to record periodically in a non-volatile memory, in the transaction zone of the provider's card and in the reader, a service duration corresponding to the time elapsed since the insertion of the provider's card, and means to transmit from the reader to the central server pieces of information on the beneficiary, the provider, the service time for the various transactions made as well as information on the type of services rendered.

The central organisation controls the server and can collect information on the transactions made. But it can also check the use of the readers (authorisation granted to the different beneficiaries, service time allocated to the said beneficiaries, whereby the said time allocations can be updated after reception of the information on the transactions made). The information transfer from the reader placed at a beneficiary's home to the central server unfurls preferably automatically at a time and day contained in the non-volatile memory of the reader, whereas this memory has been loaded previously by the beneficiary's card.

The service providing entities that manage the providers, i.e. in practice their employers, may collect, directly from the providers, the information pertaining to the tasks performed: this is done via the providers' smart cards which contain the same pieces of information (notably the service time) as those transmitted to the central server. Both sets of information can thus be matched easily.

1. The Beneficiary:

In the particular embodiment described, each beneficiary possesses a personal smart card and a smart card reader located at his/her home. The reader can communicate with a central server, which is held by the central structure (a public entity for example). The communication can be made in many ways, but nowadays, in practice, the most appropriate channel is the telephone network, and a communication modem is therefore integrated into the reader or inserted between the reader and a telephone subscriber's wall outlet.

The beneficiary's smart card comprises, in a non-volatile memory, at least one beneficiary identification, and a quantity of working hours allocated, i.e. a credit corresponding to the number of service hours to be received. This credit is transmitted to the reader when the card is inserted in the reader during the initialisation, phase.

FIG. 2A represents a possible example of content of the non-volatile memory of the beneficiary's card, with three main zones, i.e.:

- a card identification zone (one or several fields),
- a beneficiary identification zone (several fields such as surname, first name, address, etc.),
- a parameter zone designed for the reader during transaction initialisation. This zone contains an identification code of the beneficiary. It may also contain the time credit allocated in case when it has not been provided that the said time credit should be sent by the server to the reader. This zone may also comprise, as it will be seen below, a telephone number at which the central server may be called, as well as a time and day to call the said server.

2. The Provider

According to this embodiment it is provided that each provider should have a personal smart card. The card contains a non-volatile memory designed for storing, among other things, the working hours actually performed at a beneficiary's home.

The provider may use his/her card to justify, with respect to the service providing entity, the number of hours claimed as worked in order to be paid by the said service providing entity for the said hours.

The working hours will be written directly into the provider's card by the reader situated the beneficiary's home, at the location where the work has actually been done, and the same reader will communicate the said information to the central server, thus enabling the former the control the number of hours claimed.

FIG. 2 represents an example of organisation of the non-volatile memory of the provider's card. It comprises three zones, which are respectively:

- a card identification zone,
- a provider's identification zone (surname, first name, qualification level, etc., an identification code),
- a transaction zone, subdivided into sub-zones each corresponding to a particular transaction.

"Transaction" means a record of the working time data during a service rendered by a given provider for a given beneficiary.

A transaction sub-zone may comprise for instance the following fields:

- sub-zone number,
- beneficiary's identifier (in the form of a code recorded in the beneficiary's card and transferred, as we shall see below, into the provider's card during a service),
- time and date of the beginning of the service,
- number of working time units,
- an authentication certificate/validation (resulting from an enciphering algorithm), enabling to make sure that there has not been any frauds when using the provider's or the beneficiary's smart card,
- a service type (nature of the service),
- the supervising service provider (details).

3. The Service Providing Entity

It acts as an intermediate structure to manage the various providers. It possesses the hardware necessary to reading the content (updated after each service) of the transaction zones in the memory of the providers' smart cards.

The providers therefore communicate to this entity the content of their smart card either by travelling physically to the said entity or by remote transfer.

The services rendered by a provider are paid according to the content of the transaction zones written into the card. This content is transferred in practice to the management computer via a smart card reader. The computer processes the data and calculates the payments. It may also communicate via modem with the server of the central structure.

The service providing entity may for instance possess the necessary hardware to customise the providers' smart cards, i.e. to record on a non-volatile memory the data relating to the said providers.

4. The Central Structure.

The central structure possesses; as said previously, a central server, which can communicate with the readers installed at the beneficiaries' homes.

This server can also communicate with means of communication situated at the service providing entities. This communication is necessary to enable the lessor(s) to control the tasks performed by the service providing entities, but this communication may choose any appropriate manner. The telephone network is quite a convenient manner to establish the said communication, by using modems.

The communication between the central structure and the service providing entities is useful notably in case when the money or a portion of the money necessary to the payment of the providers is supplied by the central structure in relation to the number of hours worked by the said providers.

Besides, the central structure is normally the structure that manages the beneficiaries properly speaking, i.e. the structure who decides which beneficiaries are entitled to partake of the system and who allocates time credits to each beneficiary. In such a case, this central structure may possess the hardware necessary to customise the smart cards of the authorised beneficiaries.

Figure 3:
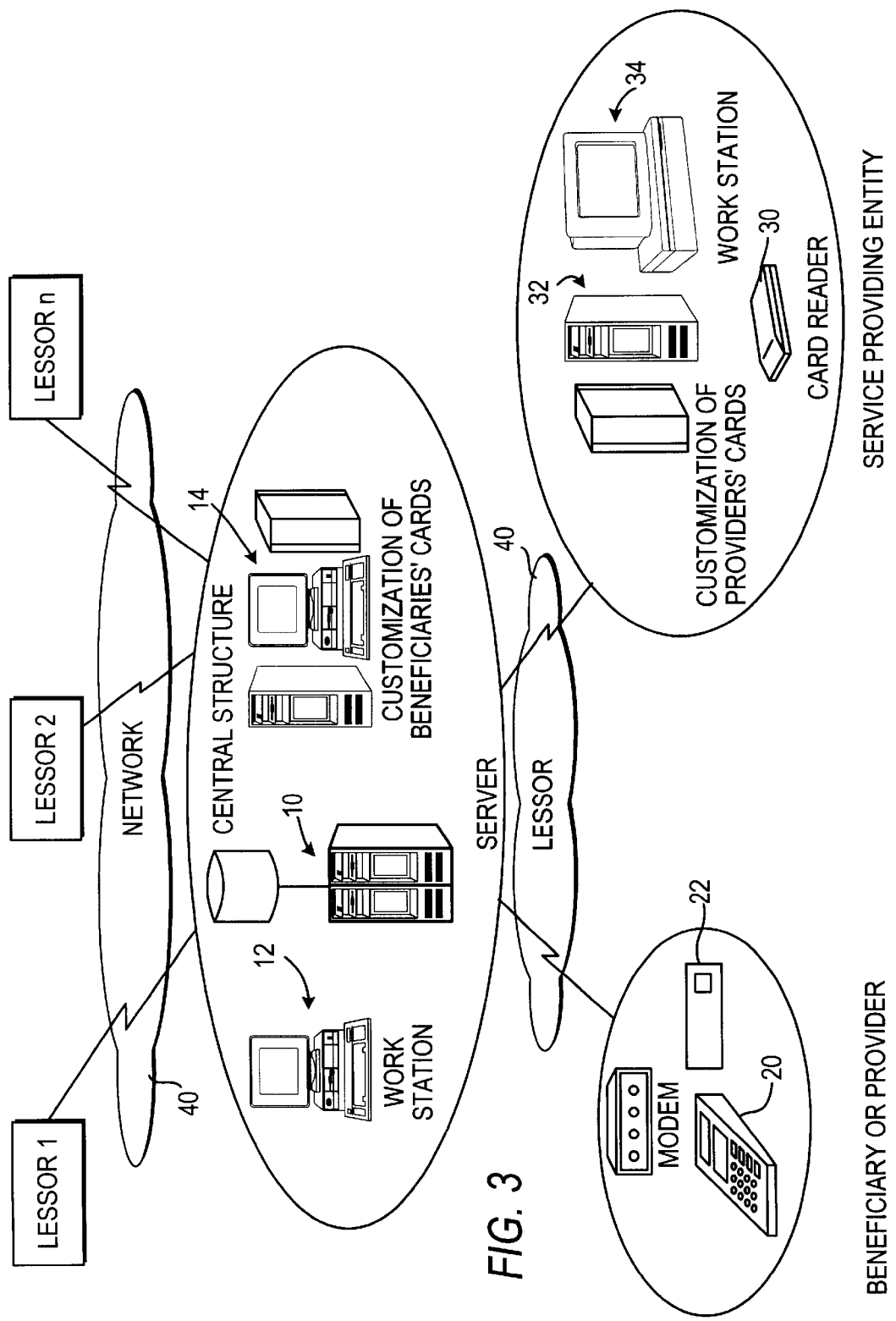
FIG. 3 represents the general architecture according to a particular embodiment of the system according to the invention.

The global architecture of the management system according to the invention is represented on FIG. 3:

- a central structure with a server 10, workstations 12 connected to this server and the card customisation hardware 14;
- a beneficiary at his/her home, with a smart card reader 20, a card 22 and a modem 24;
- a service providing entity, with a card reader 30, a card customisation hardware 32 and an information processing computer 34;
- a telephone network 40 for communication between the beneficiary's reader and the central server, or between the service providing entity and the central server.

Figure 4:
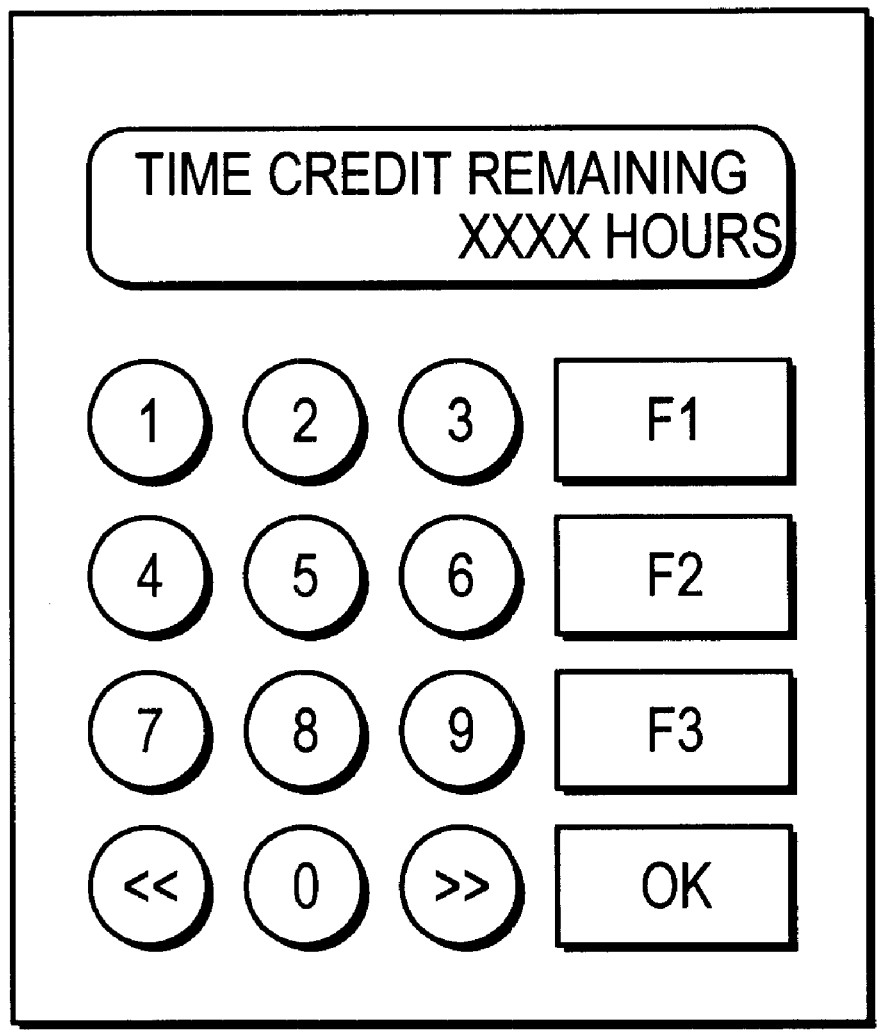
FIG. 4 represents a view of the beneficiary's reader keyboard and monitor.

5. The Beneficiary's Card Reader:

The smart card reader installed at the beneficiary's home can be quite simple as regards the keyboard and the communication monitor with the user. FIG. 4 gives an example, with a few softkeys (F1, F2, F3), a digital keypad, a validation key (OK) and a succinct display screen, for instance a two-line 16-character LCD screen.

The operation of the card reader can only be valid if the beneficiary using it is authorised, i.e. if he/she possesses a smart card granting the said rights. As we have already mentioned, the rights are granted by the central structure in the form of a beneficiary code and a time credit, both contained in a specific zone of the beneficiary's card.

The reader possesses therefore its own system programme to perform preliminary initialisation operations before commencing the transactions.

The initialisation of the beneficiary's reader during first commissioning at the beneficiary's home unfurls therefore in the three following stages, possibly by using the softkeys in order to specify that they are initialisation operations:

- inserting the beneficiary's card in the reader, in order to write into the non-volatile memory of the reader the necessary pieces of information pertaining to the beneficiary and contained on the card which has been allocated by the central structure; these pieces of information are mainly a beneficiary identification code, the time credit allocated and, as we shall see below, preferably a telephone number and a day for calling the central server; this stage is controlled by the reader which has been programmed to run it, possibly with the assistance of an operator for simple tasks (validation, etc.), an operator who may in practice be a person belonging to the service providing entity;
- removing the beneficiary's card, inserting a provider's card, and transferring into the reader data pertaining to the provider or the service providing entity responsible for the said provider;
- calling the central server in order to send data pertaining to the beneficiary and the service providing entity, and reception of data authorising the services; this authorisation is displayed on the screen.

The server is capable of transmitting to each reader any piece of information non-available on the cards or any piece of information to be renewed, whereas the reader is then capable of establishing a priority among the pieces of information that it has memorised and the pieces of information available on the card.

As regards the latter phase, the authorisation will not be granted notably in the case when the beneficiary or the service providing entity is not acknowledged by the central structure and in case when a time credit has run out. This failed authorisation would also be displayed.

It can also be provided that, more generally, the operations to be executed by the card reader after insertion of a card are not actually executed until after inserting at the keyboard a secret code, known only by the card holder, according to one of the now conventional protection processes for smart cards.

Figure 5:
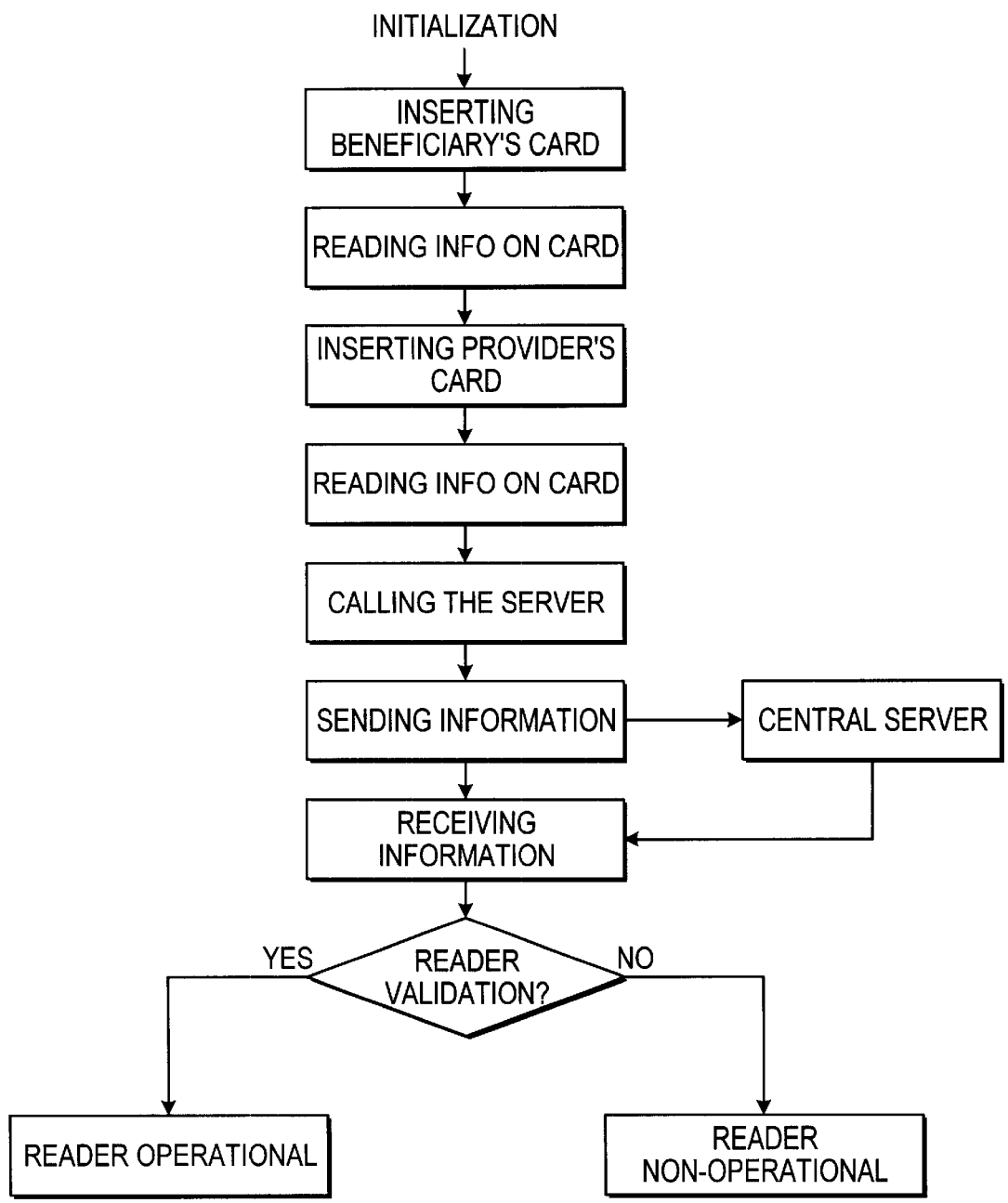
FIG. 5 represents a flowchart of the reader initialisation phase.

FIG. 5 illustrates the general flowchart of the reader initialisation phase.

Once the smart card reader has been initialised, it is ready to execute a transaction corresponding to a service.

6. A Service Transaction:

The transaction takes place according to the following process: the beneficiary's card is inserted into the reader; the information on the card pertaining to the beneficiary is read and compared in the reader with the information available since the initialisation in the reader. Any comparison discrepancy may cause the card to be rejected and the transaction to be forbidden (especially if the card is not the beneficiary's card).

Then, after recognition by the reader, the beneficiary's card is removed from the reader and replaced with the card of the provider who has visited the beneficiary to perform a service.

The information on the provider's card is read by the reader, a transaction commences and will last as long as the card remains in the reader, until a transaction completion validation operation is made.

The transaction, as seen on the management system side, consists essentially in recording time counting units elapsing while the provider's card remains in the reader. This recording is made simultaneously in the provider's card and in the reader. The transaction also comprises time and day records as well as the beneficiary's identification information.

Time is counted periodically and the time units corresponding to the period or to a multiple of the period, are recorded and cumulated in the reader memory and in the card memory. The reader has an internal clock establishing this periodicity.

Counting takes place under certain conditions, and notably under the condition that the beneficiary's card is indeed inserted into the reader and that the time allocated remaining is not zero (time after counting off the services performed previously).

At each new time unit has elapsed, the reader reads in the card memory (in the zone corresponding to the current transaction) the number of time units already recorded, it increments the same number and it records in the same memory zone the new number of cumulated units.

It performs the same operation in parallel in its own non-volatile memory: reading the number recorded previously, incrementing one unit and writing the incremented number into the same memory zone corresponding to the current transaction. Moreover, it decrements by one unit a memory zone which contains the number of units allocated to the beneficiary, a number which had been derived originally from the beneficiary's card.

The service is performed meanwhile.

Upon completion of the service, the beneficiary validates the end of the transaction by inserting his/her card into the reader. In case when the validation should be made by the provider, the said validation could be made via the validation button OK of the reader (or via a specific softkey), before the provider has removed his/her card from the reader.

This validation makes the pieces of information on the transaction final, as recorded in the memory zone corresponding to the current transaction, in the provider's card memory as well as in the reader's memory; these pieces of information relate to the time and day of the service as well as the duration of the tasks performed while the provider's card remained inserted in the beneficiary's reader.

At that stage, the beneficiary's reader contains these pieces of information on the last transactions performed. These pieces of information can be communicated over the telephone network to the central server. And this communication will unfurl automatically, without the beneficiary's participation.

Moreover, the provider's card contains the same pieces of information and he/she will be able to have the said information read by the service providing entity responsible for him/her administratively.

Figure 6:
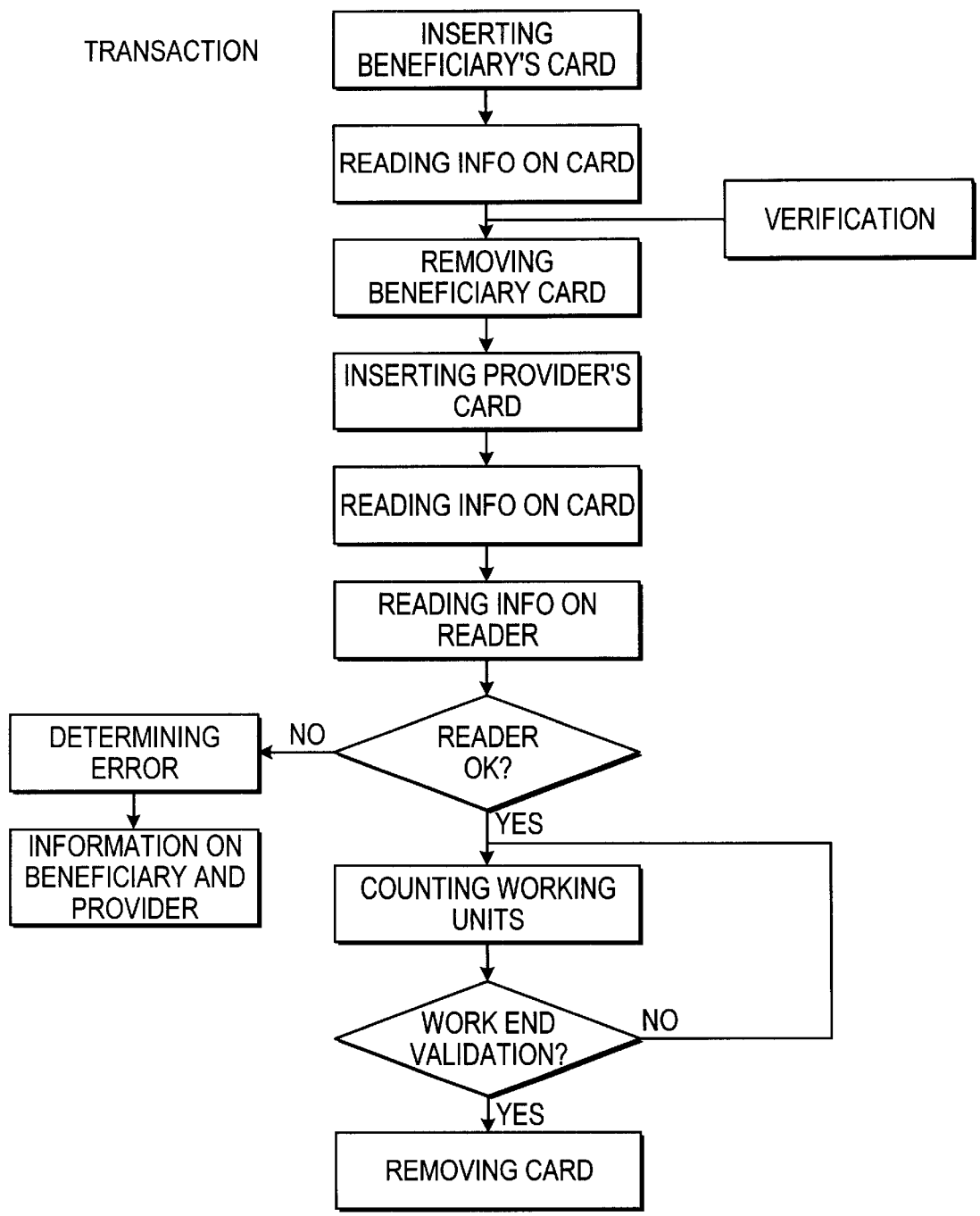
FIG. 6 represents a flowchart of a transaction phase.

FIG. 6 illustrates the general flowchart of a transaction sequence.

7. The Communication With the Central Server:

As previously seen, the reader possesses in its memory the calling number in order to communicate with the central server.

It also possesses in its memory a day and time to call the server, whereas different days and times are allocated to the different beneficiaries in order to avoid any conflicting calls. This information was downloaded into the reader from the beneficiary's card at first commissioning.

The reader is connected to a modem (or comprises a built-in modem) and is capable of initiating a dialling request by the modem at a specified time and date, using a specified calling number.

At the specified time and date, the modem is connected automatically to the server. The server programmes then control the reader to cause it to transmit the transaction information stored. The memory zones containing the information read can be reset with a view to recording future transactions.

The time and day stored in the reader are preferably a week time and day, so that the communication can be performed on a weekly basis and systematically.

The server transmits an acknowledgement of receipt of the information received and can send other pieces of information to the reader.

The time credit allocated may be up-dated by the server, then sent to the reader, while taking into account the hour consumption which has just been specified to the server; in some cases, the time credit may also be recharged using the same manner.

Finally, the control may be carried out by the reader and the reader may be invalidated if certain validity conditions are not met any longer.

This type of call will be mainly useful for validity control and possibly switching the reader off. For instance, the reader can be blocked once a pre-set duration has been exceeded after the last transaction. These particular cases are only given for exemplification purposes.

Figure 7:
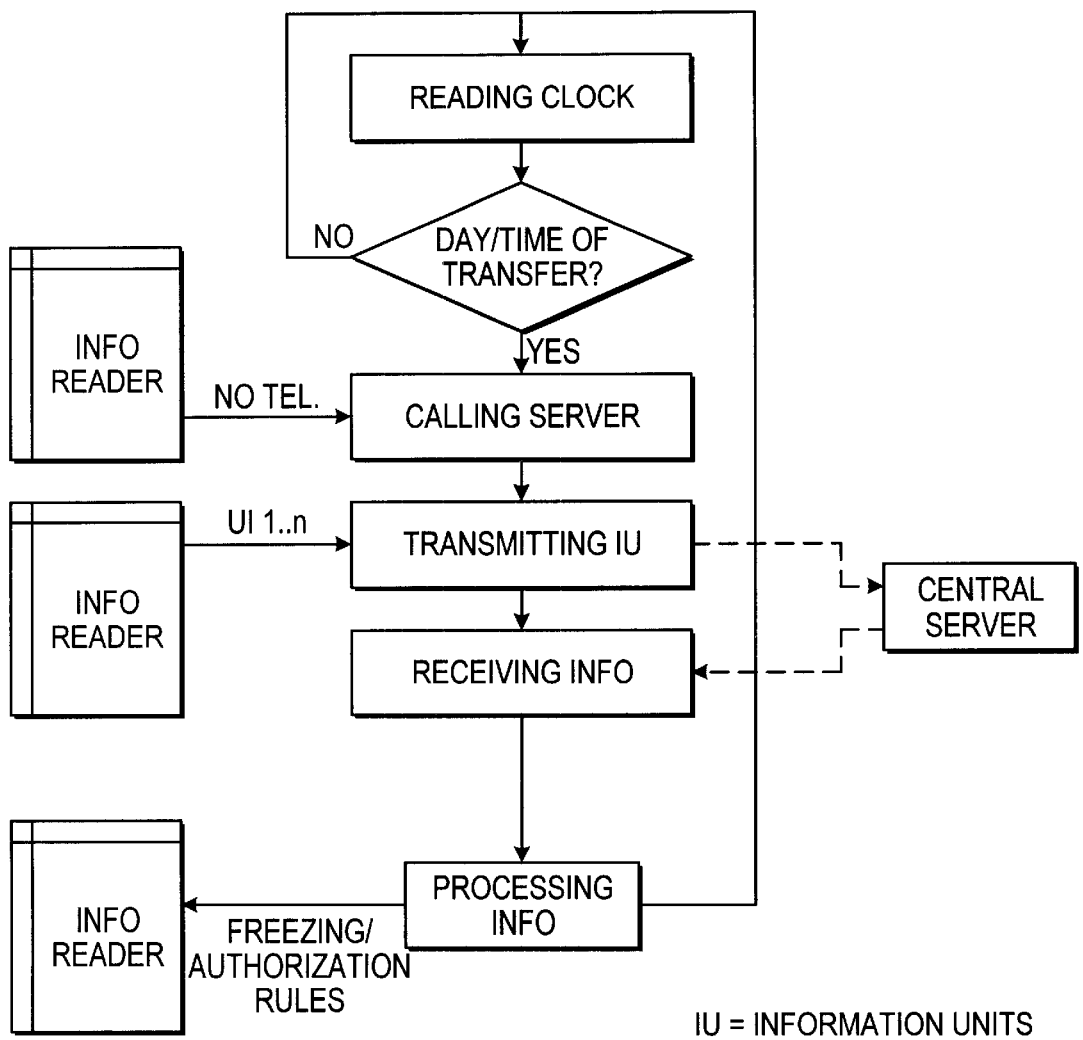
FIG. 7 represents a flowchart of the communication phase with the central server.

FIG. 7 illustrates the general flowchart of the communication functions with the server, as seen from the reader size which first starts to supervise permanently whether the time and day for calling the server have been reached.

Figure 8:
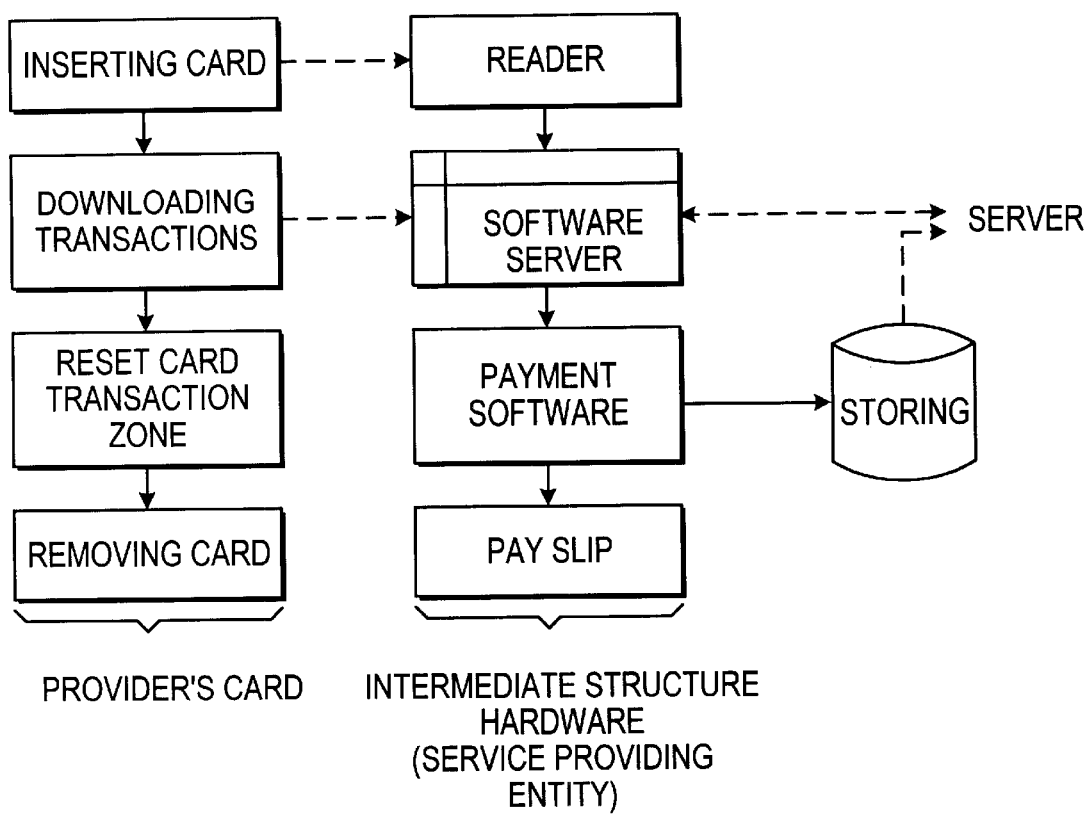
FIG. 8 represents a flowchart of the operations performed in the service providing entity.

8. Downloading the Transactions to the Service Providing Entity:

FIG. 8 illustrates diagrammatically the operations carried out by the service providing entity when the provider brings his/her card in after performing one or several tasks.

The card is inserted into a reader of the service providing entity, whereby the said reader is connected, or can be connected, to a computer capable of processing the information received from the cards of the different providers.

The various transactions memorised in the card are downloaded (working dates, working time, beneficiaries' identifiers, etc.). The transaction memory zones are reset in view of future transactions.

The computer, which processes the data, will notably draw up the corresponding wages, in this application example where the wages are paid by the service providing entity.

Communicating with the central structure, electronically or otherwise, enables to reconcile the various pieces of information.

9. Counting the Time Units and Recording:

The units are counted in the reader and the count results must be recorded periodically in the reader and in the card.

The reader records in its own non-volatile memory not only the time count at each time unit elapsed, but also the time and day of this record. Moreover, it decrements the time unit count allocated to the beneficiary.

The transactions are written in several stages to guarantee full protection, even in case of interruption (power cut, card removed accidentally).

These writing stages comprise data back-ups in a back-up zone of the non-volatile memory before being replaced with new data, and they comprise the setting of flags (also in the non-volatile memory) which specify when an operation is in progress.

For instance, a writing operation of a new time count consists in reading the former unit count in the time count zone of the non-volatile memory, in copying it into a back-up zone while setting a flag (bit to 1 for instance) indicating that the memory modification operation commences, then in incrementing the count, in rewriting the new count into the memory, and finally in deleting the flag (resetting the bit).

Thus, in case of a power cut or if the card has been removed accidentally before the flag is set, the former count will remain valid.

If the interruption takes place after deleting the flag, the new count is established. If the interruption takes place while the flag is set, the presence of the flag (in the non-volatile memory) will be detected when restoring power and there will be evidence of a faulty operation.

Comparing the contents of the main zone on the non-volatile memory and of the back-up zone will enable making a decision as regards the content to be restored in the memory.

More generally, when the reader executes an operation, identified by an operation number, belonging to a programme unit identified by a programme unit number, it can record systematically on a non-volatile memory the operation and programme unit numbers, as well as the flags so that when restoring power, the reader can locate the interruption quite easily and resume the programme at the appropriate point.

10. Additional Functionalities:

It is advisable that the transactions should unfurl correctly even under abnormal circumstances. More especially, the card reader should preferably be fitted with a card removal detector which breaks off the transaction whenever the provider's card is removed.

Power cuts can also be detected by the reader and taken into account.

The reader records in its non-volatile memory the time and day o: each elementary writing operation so that it is then possible to detect whether there has been an interruption (power cut for instance) liable to offset the countdown.

Such an offset can be measured and serve to rectify the provider's count (used to calculate his/her wages).

However, mechanisms taking these cuts into account only when limited in number and duration for the same transaction or over the same time period, can also be contemplated. For example, one stop per one-hour section is tolerated, whereby the stops should only be shorter than five minutes.

Finally, to guarantee authenticity and integrity of the information recorded, notably that pertaining to the duration, the reader might comprise certification programmes.

Such programmes consist in calculating and recording on a non-volatile memory, using a secret algorithm, a result or certificate, on the basis of data whose integrity should be ensured and on the basis of keys such as for instance the card identification number.

This certificate is calculated and written by the reader into the provider's card and is checked next time the card is used.

What is claim is:

1. A control and management system comprising
   service beneficiaries' and/or service providers' smart cards,
   smart card readers at service sites, and
   a central server capable of communicating with the readers,
   each reader comprises means for initializing a service transaction when the beneficiary's and/or provider's card is inserted therein, means for initializing a service time count after initialization of the transaction and until a service ending time, means for recording, periodically on a non-volatile memory, information relating to the performance of the services, and means for transmitting the information from the reader to the central server.

2. A control system according to claim 1, wherein the information relating to the performance of a service comprise data identifying and indicating the nature of the service.

3. A control system according to claim 2, wherein the information transmitted contains:
   an identifier of at least one service provider,
   an identifier of a beneficiary of the service,
   an identifier of at least one lessor sponsoring the service,
   and data indicating the nature of the service comprising:
      the date and the time,
      the service duration,
      a piece of information significant of the nature of the task corresponding to the service.

4. A control system according to claim 1 further comprising a number of beneficiaries' smart cards and a number of providers' smart cards, and the card readers at the sites are fixedly installed at the service sites.

5. A control system according to claim 1, wherein said smart cards comprise only providers' cards, and the readers are fixedly installed at the service sites.

6. A control system according to claim 1, wherein said smart cards comprise only beneficiaries' cards, and the readers are portable readers to be carried by the providers.

7. A system according to claim 1, wherein the smart cards further comprise non-volatile memory in the beneficiary's and/or provider's cards, said memory contains a field for time credit allocated and a field for identifying the beneficiary and/or the provider, the contents of these fields are downloaded to the non-volatile memory of the reader during a phase preceding the initializations.

8. A system according to claim 1, wherein the non-volatile memory of a beneficiary's and/or a provider's card comprises a number for calling the central server as well as a time and day for calling, and the reader comprises means for recording in its non-volatile memory this number, said day and said time from the card, as well as means for automatically communicating with the server at said number at said time and day.

9. A system according to claim 1, wherein the non-volatile memory of the reader during a first time use of the reader at a new site stores in said non-volatile memory information contained in the beneficiary's and/or the provider's card, and a code for identifying the beneficiary and/or the provider as well as a time credit allocated.

10. A system according to claim 1, wherein each reader comprises means for transferring to the central server, during the initialisation phases, data relating to the beneficiary and the service provider, and for receiving from the server validation data authorising a transaction.

11. A system according to claim 10, wherein the server comprises means for transmitting to each reader information not available on the cards, the readers comprise means for establishing a priority between said transmitted information and the information available on the card.

12. A system according to claim 1, wherein said means for initialising includes transmitting from said inserted smart card, time credit data and identity data, to said reader in which said card is inserted.

* * * * *